US007580668B2

(12) United States Patent
Regan et al.

(10) Patent No.: US 7,580,668 B2
(45) Date of Patent: Aug. 25, 2009

(54) INTELLIGENT DATA BROADCASTING

(75) Inventors: Tim Regan, Cambridge (GB); Pablo Rodriguez, Cambridge (GB); Ken Wood, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 10/899,929

(22) Filed: Jul. 27, 2004

(65) Prior Publication Data

US 2006/0025068 A1 Feb. 2, 2006

(51) Int. Cl.
*H04H 20/71* (2008.01)
*H04M 11/04* (2006.01)
*H04M 3/42* (2006.01)

(52) U.S. Cl. ................. 455/3.01; 455/404.2; 455/414.2

(58) Field of Classification Search ............. 455/414.2, 455/3.01, 404.2
See application file for complete search history.

(56) References Cited

U.S. PATENT DOCUMENTS 6,463,265 B1 10/2002 Cohen et al.
6,560,777 B2 5/2003 Blackketter et al.
2003/0028901 A1 2/2003 Shae et al.
2003/0114136 A1 6/2003 Dietz et al.
2003/0143982 A1* 7/2003 Wolters et al. .............. 455/414
2003/0163528 A1 8/2003 Banerjee et al.
2005/0063409 A1* 3/2005 Oommen .................... 370/432
2005/0257242 A1* 11/2005 Montgomery et al. ....... 725/116
2005/0282571 A1* 12/2005 Oprescu-Surcobe et al. 455/503
2006/0020972 A1* 1/2006 Regan et al. .................. 725/46
2006/0168301 A1* 7/2006 Chang et al. ................ 709/231

* cited by examiner

*Primary Examiner*—Matthew D Anderson
*Assistant Examiner*—Bobbak Safaipour

(57) ABSTRACT

Systems and methods for intelligent data broadcasting techniques are disclosed. A data broadcasting system receives profile information representative of information desired by subscribers to the data broadcasting system. Broadcast content in one or more broadcast regions may be adjusted in response to changes in aggregate user preferences in the region.

19 Claims, 6 Drawing Sheets

300

| | |
|---|---|
| Subscriber ID: ABC123 302 | |
| Sports 310 | Soccer 312<br>Baseball 314 |
| Finance 320 | Stock Quotes 322<br>Mortgage Rates 324 |
| Business 330 | Weekly Update 332 |
| Entertainment 330 | New Hits 332<br>Fallen Stars 334 |

Fig. 3

400

| Document Number 410 | Content 420 | Broadcast Periodicity 430 | Start Time 430 | Stop Time 450 |
|---|---|---|---|---|
| Document 1 | Soccer | 60 Minutes | 06:00:00 | 06:05:00 |
| Document 2 | Baseball | 20 Minutes | 06:05:00 | 06:07:00 |
| Document 3 | Fallen Stars | 300 Minutes | 12:25:00 | 12:35:00 |
| Document 3 | Weekly Update | 600 Minutes | 10:00:00 | 11:00:00 |
| Document 5 | Mortgage Rates | 60 Minutes | 08:35:00 | 08:55:00 |
| • | | | | |
| • | | | | |
| Document n | New Hits | 300 Minutes | 12:15:00 | 12:25:00 |

Fig. 4

INTELLIGENT DATA BROADCASTING

TECHNICAL FIELD

The described subject matter relates to electronic communication, and more particularly to intelligent data broadcasting.

BACKGROUND

The term "data broadcasting" (also referred to sometimes as "datacasting") refers generally to the widespread distribution of the same content to a plurality (typically a large number) of receivers. Advances in electronic computing and communication technology, particularly wireless communication technology, have enabled data broadcasting techniques to be applied in wireless communication markets to service mobile receivers. Examples of such technologies include Digital Audio Broadcast, or Digital Video Broadcast. The content is broadcast to multiple clients simultaneously using the same physical channel (e.g., the same time slot or frequency), thereby efficiently using network resources. Regardless of the number of receivers, the server only sends one copy of the content, thus minimizing the impact in the server's capacity.

Conventional data broadcasting systems are push systems, which do not permit users to specify the content that is pushed through the broadcast communication channel. Rather, data broadcasting systems pre-select a number of documents to be broadcasted. Documents are placed in a queue, sometimes referred to as a "carousel" and broadcast sequentially in a rotating manner.

Bandwidth limitations in the wireless communication channel(s) available to data broadcasting services establish a real physical limit to the amount of content that a data broadcasting service can distribute in a given time period. Improved content distribution schemes would enable data broadcasting services to manage limited bandwidth more effectively and to provide improved services to customers.

SUMMARY

Implementations described and claimed herein provide systems and method for intelligent data broadcasting. In exemplary implementations one or more computing devices associated with a data broadcasting system maintains profile data records for subscribers to the data broadcasting system. The allocation of content in the broadcast carousel for a broadcast region may be adjusted in response to changes in the demand for specific documents among subscribers in the broadcast region.

In exemplary implementations information is received locating at least one subscriber unit of the data broadcasting system in a specific geographic region of the data broadcasting system, and a rate of recurrence of broadcast information is adjusted in the specific region of the data broadcasting system as a function of profile information associated with the at least one subscriber unit.

In other implementations an initial broadcast recurrence rate for each document in a data broadcast region is established, profile information for a plurality of subscriber units in the data broadcast region is monitored; and the broadcast recurrence rate of broadcast information in the specific region of the data broadcasting system is adjusted as a function of profile information associated with the plurality of subscriber units.

BRIEF DESCRIPTION OF THE DRAWINGS

FIG. 3 is an illustration of an exemplary data structure for holding subscriber profile information.

FIG. 4 is an illustration of a data structure representing a data broadcasting carousel.

DETAILED DESCRIPTION

Exemplary implementations of methods, systems, and computer program products for intelligent data broadcasting are described herein. In certain implementations, techniques can utilize subscriber preference and/or location information to adjust the data broadcast content within a specific data broadcast region. In certain implementations, a network management system can adjust data broadcast content on one or more data broadcasting regions in a dynamic fashion in response to changes in the distribution of subscriber preferences in the region.

Exemplary Operating Environment

Figure 1:
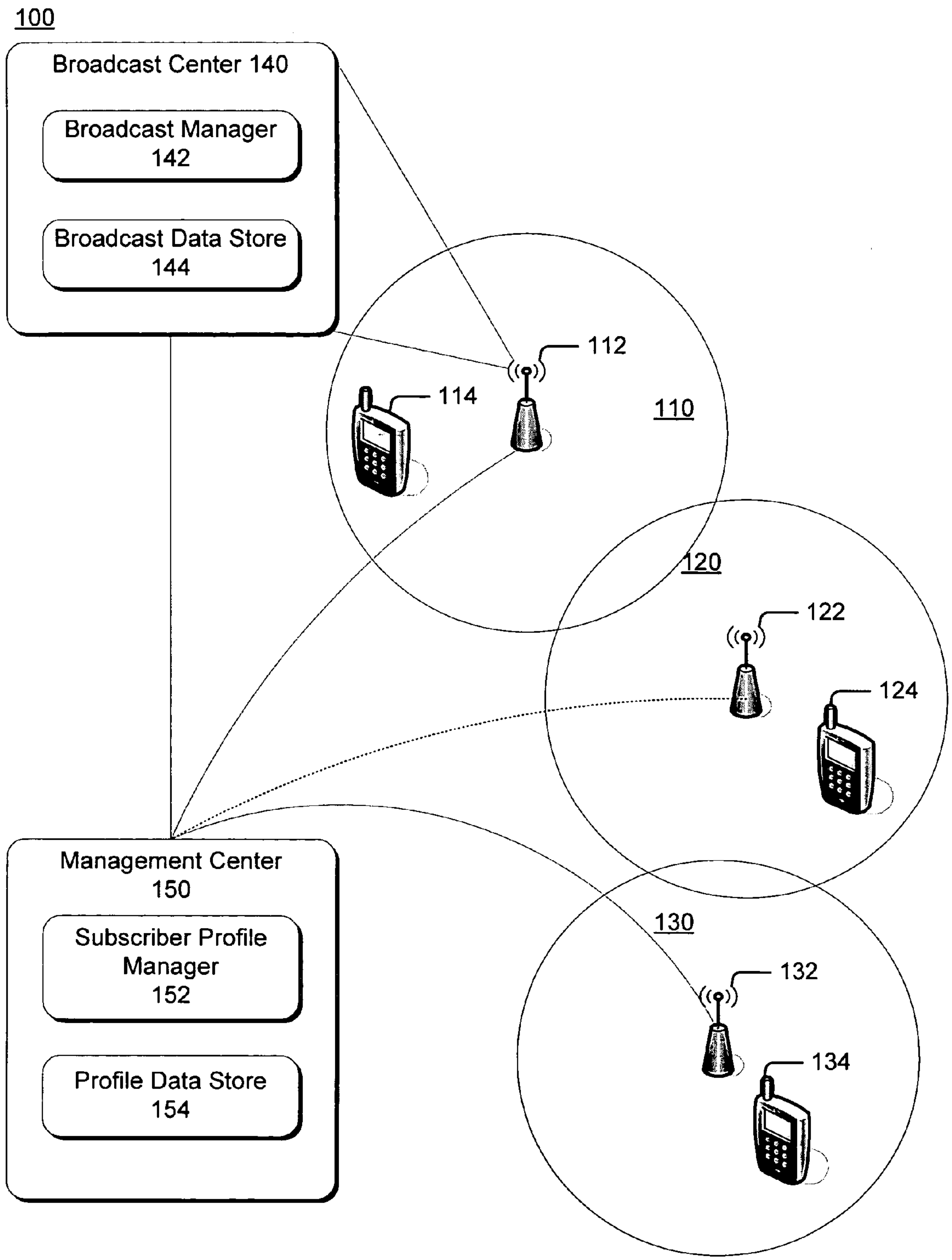
FIG. 1 is a schematic illustration of an exemplary implementation of a data broadcasting network.

FIG. 1 is a schematic illustration of an exemplary implementation of a data broadcasting environment 100 in which the subject matter described herein may be implemented. It will be appreciated that the environment 100 depicted in FIG. 1 is merely an exemplary environment and is not intended to suggest any limitation as to particular uses or functionality. The subject matter described herein may be implemented in a wide variety of data distribution environments including, but not limited to, radio, television, and satellite networks, digital radio systems, broadcast disk systems, publish/subscribe systems, Internet-based broadcasting systems, and the like.

Referring to FIG. 1, the environment 100 includes at least one head end 112 that broadcasts data throughout a broadcast region 110 to one or more receivers 114 that subscribe to a data broadcasting service transmitted from head end 112. As used herein, the term broadcast and its derivatives should be construed broadly to encompass any form of modulating, coding, and/or transmitting of a communication signal across a communication medium, wired or wireless. Similarly, as used herein, the term "subscribe" should be construed broadly to encompass any form of receiving, demodulating, and/or decoding of data broadcast head end 112.

In the implementation depicted in FIG. 1 the broadcast environment 100 includes multiple broadcast regions 110, 120, 130, each of which includes a head end 112, 122, 132. Each head end 112, 122, 132 broadcasts data throughout its respective broadcast region. Although FIG. 1 illustrates three separate head ends 112, 122, 132 defining three broadcast regions 110, 120, 130, it will be appreciated that the specific number of regions is not important, and may vary depending upon, e.g., the geographic size of the operating environment, transmission power constraints, and interference and/or obstructions of the signal(s) broadcast from the respective head ends 112, 122, 132. Also, it will be appreciated that there need not be a one-to-one correspondence between head ends and broadcast regions.

Head ends 112, 122, 132 further include infrastructure necessary for broadcasting a data signal. In a wireless communication environment such infrastructure may include equipment for encoding, modulating, and transmitting or transceiving a radio frequency (RF) signal at a specific frequency (or frequencies), or in accordance with a specific multi-frequency protocol. Such equipment is readily commercially available, and is known to those skilled in the art. The particular encoding, modulating, and/or transmission scheme is not important.

The broadcast environment 100 further includes a plurality of receivers 114, 124, 134, which may be embodied as wireless communication devices such as, e.g., personal computers (PCs), laptop computers, personal digital assistants (PDAs), mobile phones, or the like. In one exemplary implementation receivers 114, 124, 134 include an uplink communication system that enables a server to determine location information associated with the receivers 114, 124, 134. The location information does not need to precisely define the location of the user. In one implementation the location information simply indicates the current head end 112, 122, 132 providing service to a given receiver. In such an implementation each receiver 114, 124, 134 includes an identifier that uniquely identifies the receiver from all other receivers in the system. The unique identifier may be transmitted from the receiver 114, 124, 134 to the respective head end 112, 122, 132 providing service to the receiver, e.g., on a control channel or on a data channel. Such transmissions could make use of SMS notifications, or small IP messages sent from the client's device to a database using traditional two-way wireless communication systems (e.g., GSM/CDMA).

In an exemplary implementation each head end 112, 122, 132 is assigned a unique identifier within broadcast environment 100. A head end 112, 122, 132 may be identified by a network address, station name, a carrier frequency, or other distinct designation. A data broadcast from a head end 112, 122, 132 to a receiver 114, 124, 134 takes place over a communication channel. In an exemplary implementation the communication channel(s) may be defined by modulating a carrier wave in accordance with any conventional RF broadcasting technique such as, e.g., TDMA, FDMA, CDMA, or the like. The transmitted content may include various forms of data including, e.g., text, audio, video, and may also include control signals including, e.g., timing signals, power signals, location signals, etc. Control signals may be broadcast in-band, or on a separate control channel.

Broadcast environment 100 further includes a broadcast center 140 for managing the broadcast operations of one or more head ends 112, 122, 132, and a management center 150 for managing subscriber profile information and other network management information. Broadcast center 140 includes a broadcast manager 142 and a broadcast data store 144. Management center 150 includes a subscriber profile manager 152 and a subscriber data profile 154. Broadly, the broadcast center 140 cooperates with the management center 150 to manage subscriber information, network information, and data broadcasting from one or more of the respective head ends 112, 122, 132 of the operating environment 100.

In one exemplary implementation broadcast center 140 and management center 150 may reside on a single computing device such as, e.g., a server computer associated with broadcasting environment 100. In alternate implementations the responsibility for broadcast management and subscriber profile management may be distributed between the head ends and the management center 150 in a different manner, or may be consolidated in either the management center 150 or the head ends 112, 122, 132. For example, the environment 100 may include a single management center 150, but each head end 112, 122, 132 may include a broadcast center 140.

In an exemplary implementation the respective head ends 112, 122, 132 cooperate with the management center 150 to implement a data broadcast network that may cover a geographic region ranging in size from a region as small as a specific building or a corporate or academic campus to a region as large an entire country or continent. Broadly, the head ends 112, 122, 132 cooperate with the management center 150 to manage subscriber information, network information, and data broadcasting.

Figure 2:
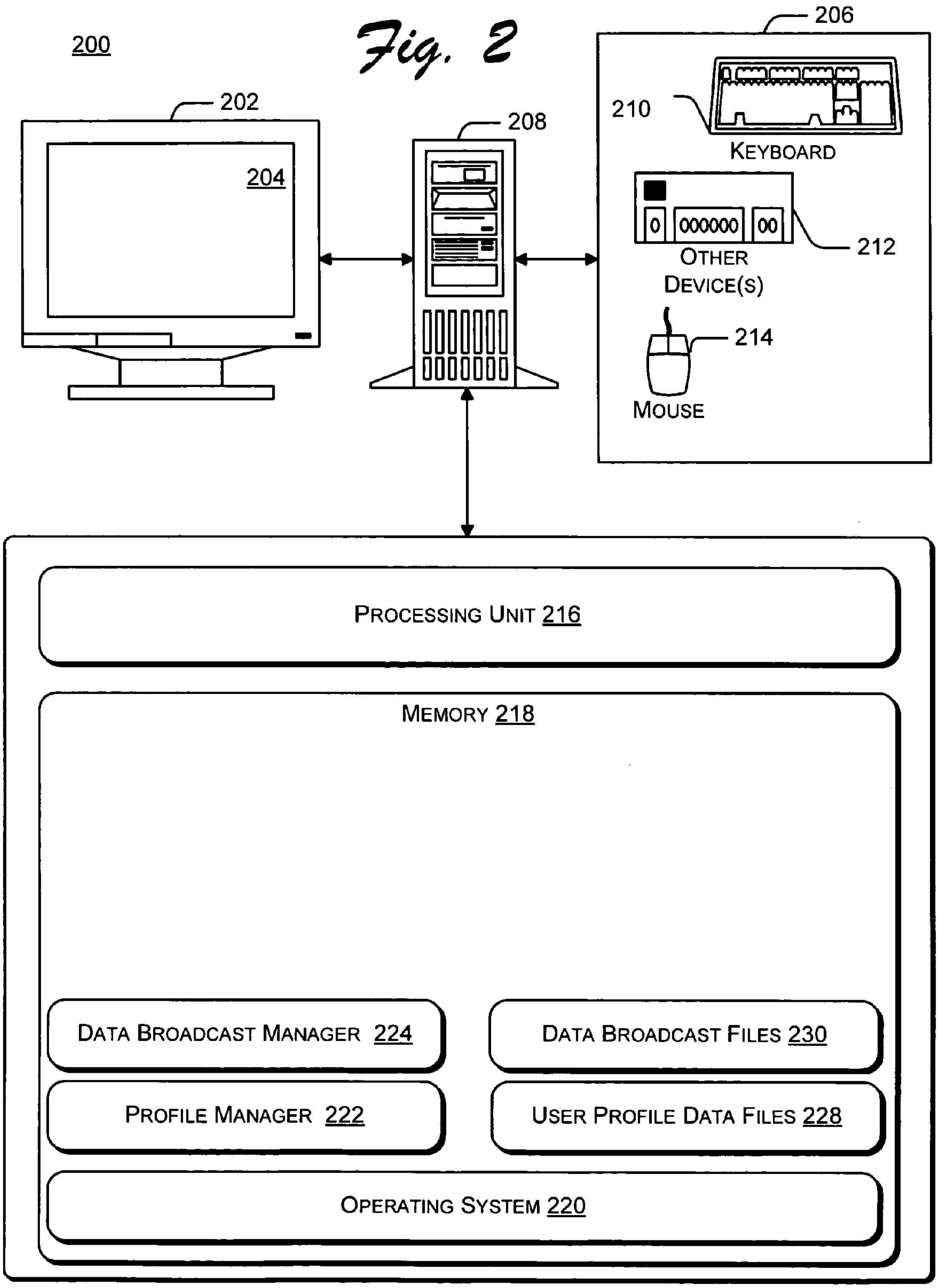
FIG. 2 is a schematic depiction of an exemplary system for intelligent data broadcasting.

FIG. 2 is a schematic illustration of an exemplary computer system 200 adapted to include a broadcast center 140 and a management center 150. This computer system 200 includes a display 202 having a screen 204, one or more user-input devices 206, and a computer 208. The user-input devices 206 can include any device allowing a computer to receive a developer's input, such as a keyboard 210, other device(s) 212, and a mouse 214. The other device(s) 212 can include a touch screen, a voice-activated input device, a track ball, and any other device that allows the system 200 to receive input from a developer. The computer 208 includes a processing unit 216 and random access memory and/or read-only memory 218.

Memory 218 includes an operating system 220 for managing operations of computer 208. In an exemplary implementation one or more application programs executable on the processing unit 216 reside in memory 218, including a profile manager 222 and a broadcast manager 224. Memory 218 further includes one or more data files including user profile data files 228 and data broadcast files 230. Operation of the system 200 is explained in greater detail below.

FIG. 3 is an illustration of an exemplary data structure for subscriber profile information. In an exemplary implementation a subscriber to the data broadcasting system maintains a subscriber profile including a subscriber identity and specifying particular categories of information of interest to the subscriber. This information may be stored in a suitable memory location such as, e.g., the user profile data files 228 stored in the memory 218 of computer 208. The file may be embodied as, e.g., a relational database. In an exemplary implementation the subscriber profile information may also be stored in the memory 318 of the data broadcasting receiver, e.g., in the user profile data files 328.

Referring to FIG. 3, the subscriber profile information data structure includes a subscriber ID data field 300 and one or more categories of information of interest. In the exemplary data structure illustrated in FIG. 3, the categories of interest include sports 310, finance 320, business 330, and entertainment 340. Each category may include sub-categories specifying in further detail information of interest to the subscriber identified by subscriber ID 300. In the exemplary implementation illustrated in FIG. 3 the sports category 300 includes a soccer sub-category 312 and a baseball sub-category 314. The finance category 320 includes a stock quotes sub-category 322 and a mortgage rates sub-category 324. The business category 330 includes a weekly update sub-category 332, and the entertainment category includes a new hits sub-category 342 and a fallen stars sub-category 344. It will be appreciated that the data structure depicted in FIG. 3 may be expanded to include additional layers of sub-categories further detailing information of interest to a subscriber. By way of example, the soccer sub-category 312 may be expanded to include information about one or more specific teams or the stock quotes category 342 may be expanded to include information about one or more specific stocks. It will be appreciated that the subscriber profile information data structure may include other specific personal information or links to other specific personal information such as, e.g., electronic mail, electronic calendars, etc.

In an alternate implementation the subscriber profiles may be specific to the respective broadcast region 110, 120, 130 in which the subscriber device is operating. By way of example, a subscriber may be interested in a particular set of information when the subscriber is in broadcast region 110 and a different set of information when the subscriber is in broadcast region 130. In such an implementation the subscriber profile may be modified to include a data broadcast region indicator and corresponding data of interest for the particular broadcast region(s).

FIG. 4 is an illustration of a data structure representing a data broadcasting schedule 400 for data broadcasting system 100. The data broadcasting schedule 400 may be stored in the broadcast data store 144, e.g., as one of the broadcast data files 230 stored in the memory 218 of computer 208. In an exemplary implementation the data broadcasting schedule 400 may be represented in tabular format as a series of documents 410 for broadcast, each of which is identified by a content identifier 420 that describes the content of the document. The broadcast schedule 400 further includes a broadcast periodicity 530 associated with the document that defines the periodicity with which the document is broadcast. The broadcast schedule further includes a start time 440 and a stop time 450 for each document. By way of illustration, the broadcast schedule depicted in FIG. 5 reflects that document number 1 in the broadcast schedule includes soccer information, and is broadcast every sixty minutes beginning at 06:00:00 and terminating at 06:05:00.

In an exemplary implementation the data broadcast manager 224 maintains the data broadcast schedule 400. The data broadcast manager 224 may include a user interface that permits a user to add documents to or delete documents from the data broadcast schedule 400, and/or to modify the periodicity with which documents are broadcast. The broadcast duration is a function of the amount of data to be broadcast and the bandwidth available to the data broadcasting system 100. When a scheduled broadcast is complete the broadcast manager 224 may update the start time 440 and stop time 450 to reflect the next broadcast of the document.

The data broadcast files 230 may also include the content to be broadcast. By way of example, the soccer document may include scores and other information about soccer teams, the stock quotes may document may include current quotes for particular stocks. This information may be updated periodically by the data broadcast manager 224 or by another application program executing on the processing unit 216 of computer 208. When the scheduled broadcast time for a document arrives, the broadcast manager retrieves the document from the data broadcast files 230 and broadcast the document over from one or more head ends 112, 122, 132 in the system 100. In this regard, it will be appreciated that the broadcast schedule may be specific to each head end 112, 122, 132, such that the broadcast schedule is different in each broadcast region 110, 120, 122.

Exemplary Operations

In an exemplary implementation, the broadcast manager(s) 224 cooperate with the profile manager(s) 222 to manage the data broadcast in each broadcast region 110, 120, 130 in an intelligent manner which reflects the aggregate interests of the subscribers in the broadcast region.

Figure 5:
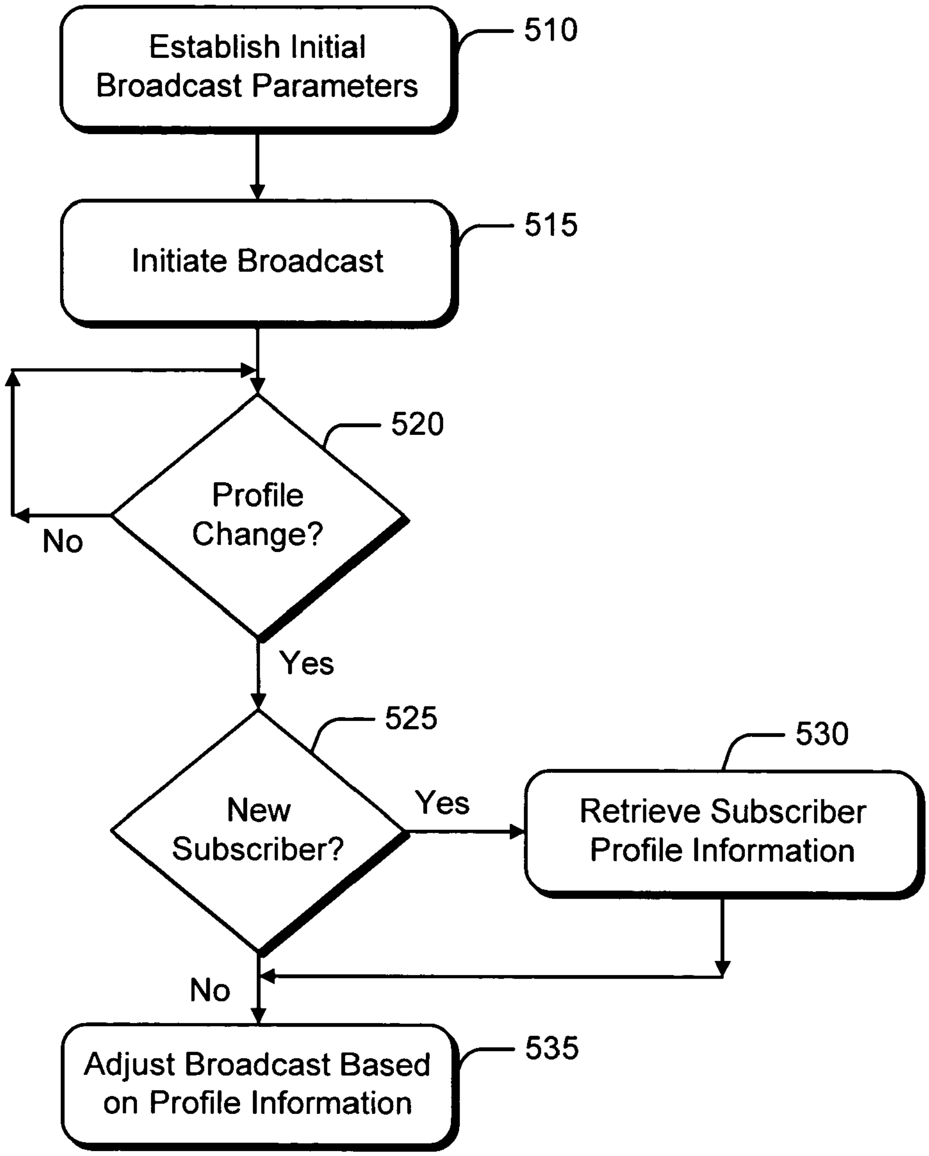
FIG. 5 is a flowchart illustrating operations in an exemplary method for intelligent data broadcasting.

FIG. 5 is a flowchart illustrating operations in an exemplary method for intelligent data broadcasting. In an exemplary implementation the operations of FIG. 5 may be implemented by the data broadcast manager 224 of computer 208. In alternate implementations certain of the operations may be performed by the profile manager module 222 of computer 208. As described above, the broadcast manager and the profile manager may be centrally located in a single computer. Alternately, each head end 112, 122, 132 may maintain an independent broadcast manager and/or profile manager, which may communicate as necessary to implement intelligent broadcast operations.

Referring to FIG. 5, at operation 510 the broadcast manager 224 establishes initial broadcast parameters which may be reflected, e.g., in a broadcast schedule such as broadcast schedule 400. In an exemplary implementation the initial broadcast parameters may by allocated, in part, in a manner that reflects the aggregate user profile data for a broadcast region 110, 120, 130. By way of example, and referring to FIG. 5, if ninety percent of the subscribers serviced in a particular region express an interest in mortgage rates in their subscriber profile, then mortgage rates may be allocated a relatively frequent rate of recurrence for data broadcasting, e.g., every sixty minutes. In alternate implementations the initial broadcast parameter may be set without regard to the interests expressed in the subscriber profiles. At operation 515 the broadcast manager 224 initiates the broadcast.

At operation 520, the subscriber profiles for the broadcast region 110, 120, 130 are monitored for changes. This monitoring operation may be performed by either the broadcast manager 224 or by the profile manager 222. If no changes are detected, then the broadcast schedule continues unaffected.

By contrast, if a profile change is detected in a broadcast region 110, 120, 130, then control passes to operation 525 where it is determined whether the detected profile change is attributable to a new subscriber entering the region. In one exemplary implementation receivers 114, 124, 134 include a thin uplink communication system that enables a server to determine location information associated with the receivers 114, 124, 134. The location information does not need to precisely define the location of the user. In one implementation the location information simply indicates which head end 112, 122, 132 is currently providing service to a given receiver. In such an implementation each receiver 114, 124, 134 includes an identifier that uniquely identifies the receiver from all other receivers in the system. The unique identifier may be transmitted from the receiver 114, 124, 134 to the respective head end 112, 122, 132 providing service to the receiver, e.g., on a control channel or on a data channel. Such transmissions could make use of SMS notifications, small IP messages sent from the client's device to a database using traditional two way wireless communication systems (e.g., GSM/CDMA), or another messaging protocol.

In alternate implementations more sophisticated locating techniques may be applied. These alternate techniques may be particularly useful when a receiver is within range of two or more head ends 112, 122, 132. In one alternate implementation signals from a receiver 114, 124, 134 received in two different head ends 112, 122, 132 may be used to determine location information. In one implementation the strength of the signals received at two different head ends 112, 122, 132 may be compared to determine which of the two head ends is receiving a stronger signal, and the head end with the strongest signal may modify its broadcast schedule to reflect the addition of the subscriber to the broadcast region. This technique may be applied to any number of head ends 112, 122, 132.

In another alternate implementation signals from a receiver 114, 124, 134 received by three separate head ends 112, 122, 132 may be used to precisely locate a receiver using conventional triangulation techniques. The particular location technique applied is not critical.

Referring again to operation 525, if the detected profile change is not due to a new subscriber entering the region, then the profile change may be attributed to an existing subscriber (s) modifying their profile information. In this case control passes to operation 535 and the broadcast schedule is adjusted based on the updated profile information. By contrast, if at operation 525 the detected profile change is due to a new subscriber entering the region, then control passes to operation 530 and the new subscriber profile information is retrieved, e.g., from the user profile data files 228. Control then passes to operation 535 and the broadcast schedule is adjusted based on the updated profile information.

Figure 6:
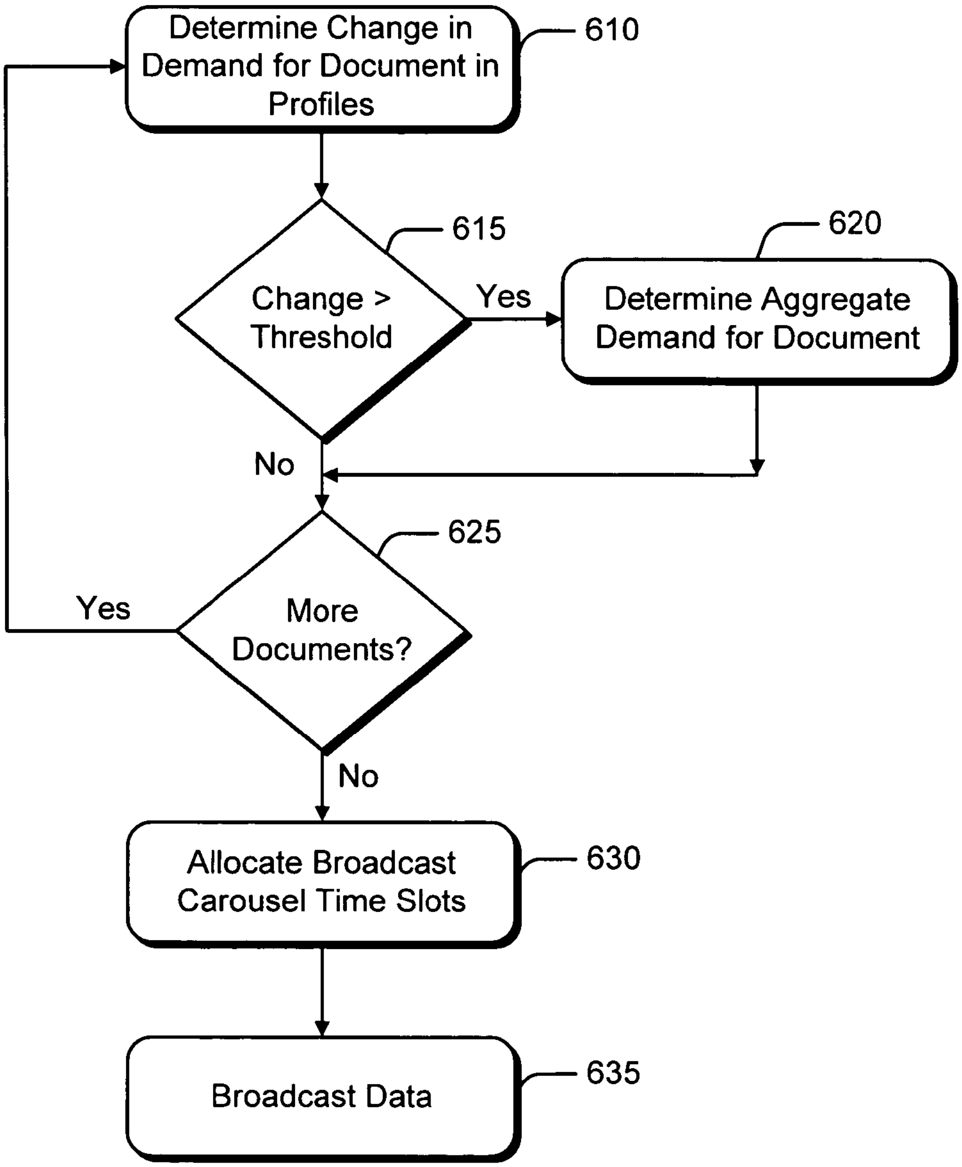
FIG. 6 is flowchart illustrating operations in an exemplary method for allocating time slots in a data broadcasting carousel.

FIG. 6 is a flowchart illustrating operations in an exemplary method for adjusting the broadcast schedule, as described in connection with operation 535. In an exemplary implementation the operations of FIG. 6 may be invoked every time there is a profile change for in a broadcast region 110, 120, 130. In an alternate implementation the operations of FIG. 6 may be performed on a periodic basis or based on one or more events, i.e., if a predetermined number of threshold changes have occurred.

Referring to FIG. 6, at operation 610 the change in demand for one or more documents is determined. In an exemplary implementation this operation may be performed by comparing the number of subscriber units in the profile region that include a particular document in their profile information at the current point in time with a corresponding number of subscriber units at a previous point in time. Statistical techniques such as, e.g., rolling averages may optionally be used to smooth measurement variations over time.

Operation 615 is an optional thresholding operation. If, at operation 615, the change in demand for one or more documents is not greater than a threshold, then the change in demand for the document(s) may be ignored and control passes to operation 610 to examine the change in demand for another document in the broadcast carousel.

By contrast, if at operation 615 the change in demand exceeds a threshold, then control passes to operation 620 and the demand for the document is determined. In an exemplary implementation the demand may be determined by calculating the proportion of subscriber units in a particular broadcast region that include a document in their respective user profile. In alternate implementations the subscriber profiles may include an entry that indicates the frequency with which a subscriber would like to have the information in this document refreshed, i.e., a desired refresh rate, and the desired refresh rate may be incorporated into the demand calculation.

If, at operation 625, there are more documents to be processed then control passes back to operation 610 and the change in demand for the next document is determined. The operations 610-625 may be repeated until there are no further documents to process.

At operation 630 the broadcast carousel time slots are allocated. In an exemplary implementation the broadcast carousel time slots may be allocated in accordance with the aggregate of the demand numbers calculated in operation 620 using, e.g., a fairness routine or another resource allocation routine. By way of example, if the percentage of subscribers in a particular broadcast region who designate a specific document increases from forty percent to eighty percent, then the number of broadcast carousel time slots dedicated to the document may be doubled, subject to bandwidth limitations. Conversely, if the number of subscribers who designate a specific document drops, then the number of broadcast carousel time slots dedicated to the document may be reduced accordingly.

Exemplary Computing Device

Figure 7:
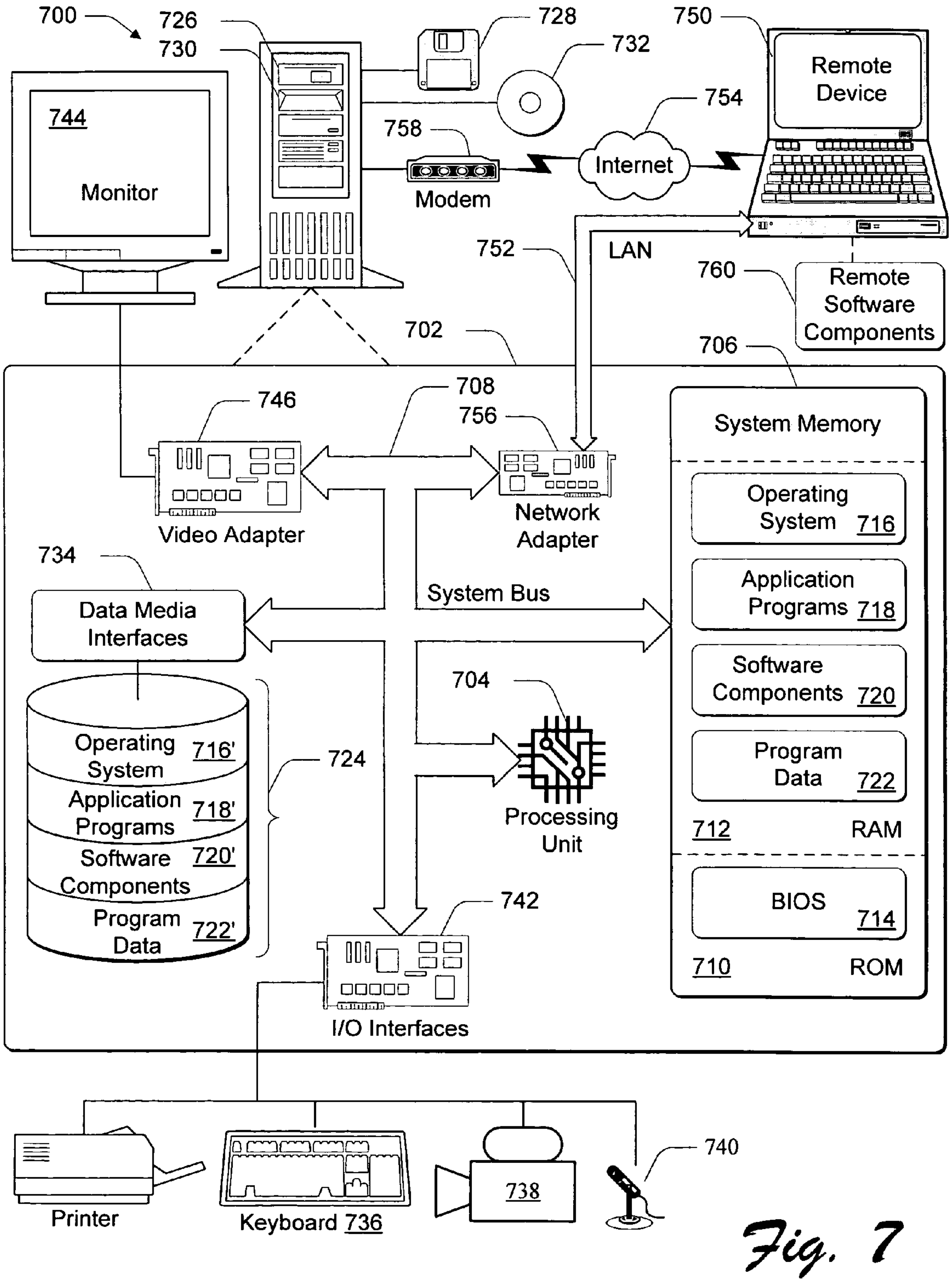
FIG. 7 is a schematic illustration of an exemplary computing device.

The various components and functionality described herein may be implemented with a number of individual computers. FIG. 7 shows components of typical example of such a computer, referred by to reference numeral 700. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs or DVD. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 700 may include, but are not limited to, a processing unit 704, a system memory 706, and a system bus 708 that couples various system components including the system memory to the processing unit 704. The system bus 708 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 700 typically includes a variety of computer-readable media. Computer-readable media can be any available media that can be accessed by computer 700 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 700. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 706 includes computer storage media in the form of volatile and/or nonvolatile memory such as read only memory (ROM) 710 and random access memory (RAM) 712. A basic input/output system 714 (BIOS), containing the basic routines that help to transfer information between elements within computer 700, such as during start-up, is typically stored in ROM 710. RAM 712 typically contains data and/or program modules that are immediately accessible to and/or presently being operated on by processing unit 704. By way of example, and not limitation, FIG. 7 illustrates operating system 716, application programs 718, other program modules 720, and program data 722.

The computer 700 may also include other removable/non-removable, volatile/nonvolatile computer storage media. By way of example only, FIG. 7 illustrates a hard disk drive 724 that reads from or writes to non-removable, nonvolatile magnetic media, a magnetic disk drive 726 that reads from or writes to a removable, nonvolatile magnetic disk 728, and an optical disk drive 730 that reads from or writes to a removable, nonvolatile optical disk 732 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 724 is typically connected to the system bus 708 through a non-removable memory interface such as data media interface 734, and magnetic disk drive 726 and optical disk drive 730 are typically connected to the system bus 708 by a removable memory interface.

The drives and their associated computer storage media discussed above and illustrated in FIG. 7 provide storage of computer-readable instructions, data structures, program modules, and other data for computer 700. In FIG. 7, for example, hard disk drive 724 is illustrated as storing operating system 716', application programs 718', other program modules 720', and program data 722'. Note that these components can either be the same as or different from operating system 716, application programs 718, other program modules 720, and program data 722. Operating system 716, application programs 718, other program modules 720, and program data 722 are given different numbers here to illustrate that, at a minimum, they are different copies. A user may enter commands and information into the computer 700 through input devices such as a keyboard 736, a mouse, trackball, or touch pad. Other input devices (not shown) may include a microphone, joystick, game pad, satellite dish, scanner, or the like. These and other input devices are often connected to the processing unit 704 through an input/output (I/O) interface 742 that is coupled to the system bus, but may be connected by other interface and bus structures, such as a parallel port, game port, or a universal serial bus (USB). A monitor 744 or other type of display device is also connected to the system bus 708 via an interface, such as a video adapter 746. In addition to the monitor 744, computers may also include other peripheral output devices (e.g., speakers) and one or more printers, which may be connected through the I/O interface 742.

The computer may operate in a networked environment using logical connections to one or more remote computers, such as a remote computing device 750. The remote computing device 750 may be a personal computer, a server, a router, a network PC, a peer device or other common network node, and typically includes many or all of the elements described above relative to computer 700. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 700 is connected to the LAN 752 through a network interface or adapter 756. When used in a WAN networking environment, the computer 700 typically includes a modem 758 or other means for establishing communications over the Internet 754. The modem 758, which may be internal or external, may be connected to the system bus 708 via the I/O interface 742, or other appropriate mechanism. In a networked environment, program modules depicted relative to the computer 700, or portions thereof, may be stored in the remote computing device 750. By way of example, and not limitation, FIG. 7 illustrates remote application programs 760 as residing on remote computing device 750. It will be appreciated that the network connections shown are exemplary and other means of establishing a communications link between the computers may be used.

CONCLUSION

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

We claim:

1. A method of managing a data broadcast, comprising:

receiving, at a server in a data broadcasting system, information locating a plurality of subscriber units of the data broadcasting system in a specific geographic region of the data broadcasting system;

determining changes in profile information of a predetermined number of the plurality of subscriber units; and adjusting a rate of recurrence of broadcast information at the server in the specific region of the data broadcasting system as a function of profile information associated with the plurality of subscriber units and by comparing the plurality of subscriber units that include a particular document its corresponding profile information at a current point in time with a corresponding number of plurality of subscriber units at a previous point in time.

2. The method of claim 1, wherein receiving, at a server in a data broadcasting system, information locating the plurality of subscriber units of the data broadcasting system in a specific geographic region of the data broadcasting system comprises receiving a signal on a communication control channel established between a first data broadcasting unit of the data broadcasting system and each of the plurality of subscriber units.

3. The method of claim 2, wherein receiving, at a server in a data broadcasting system, information locating the plurality of subscriber units of the data broadcasting system in a specific geographic region of the data broadcasting system comprises:

receiving a signal on a communication control channel established between a second data broadcasting unit of the data broadcasting system and each of the plurality of subscriber units; and determining location information for each of the plurality of subscriber units using the signal from the first data broadcasting unit and the second data broadcasting unit.

4. The method of claim 3, wherein receiving, at a server in a data broadcasting system, information locating the plurality of subscriber units of the data broadcasting system in a specific geographic region of the data broadcasting system comprises:

receiving a signal on a communication control channel established between a third data broadcasting unit of the data broadcasting system and each of the; and determining location information for the subscriber unit using the signal from the first data broadcasting unit, the second data broadcasting unit, and the third data broadcasting unit.

5. The method of claim 1, wherein adjusting the rate of recurrence of broadcast information in the specific region of the data broadcasting system as a function of profile information associated with the plurality of subscriber units comprises obtaining profile information associated with the at least one subscriber unit.

6. The method of claim 5, wherein obtaining profile information associated with the plurality of subscriber units comprises retrieving profile information from a data store.

7. The method of claim 1, wherein adjusting the rate of recurrence of broadcast information in the specific region of the data broadcasting system as a function of profile information associated with the plurality of subscriber units comprises increasing the rate of recurrence of broadcast information specified in the profile information associated with the plurality of subscriber units.

8. A method of managing a data broadcast, comprising:

establishing an initial broadcast recurrence rate for each document in a data broadcast region;

monitoring profile information and monitoring changes in profile information for a plurality of subscriber units in the data broadcast region; and adjusting the broadcast recurrence rate of broadcast information by a broadcast server in the specific region of the data broadcasting system as a function of profile information associated with the plurality of subscriber units and by comparing the plurality of subscriber units that include a particular document its corresponding profile information at a current point in time with a corresponding number of plurality of subscriber units at a previous point in time.

9. The method of claim 8, wherein monitoring profile information for a plurality of subscriber units in the data broadcast region comprises determining location information that locates a subscriber unit in the data broadcast region.

10. The method of claim 9, wherein determining location information that locates a subscriber unit in the data broadcasting region comprises comparing location signal information from a subscriber unit received at a first data broadcast region with location signal information from the subscriber unit received at a second data broadcast unit.

11. The method of claim 8, wherein monitoring profile information for a plurality of subscriber units in the data broadcast region comprises monitoring changes to profile information associated with the plurality of subscriber units.

12. A computer program product comprising logic instructions embodied on a computer-readable storage media which, when executed by a processor, configure the processor to:

activate a receiver to receive, at a server in a data broadcasting system, information locating at least one subscriber unit of the data broadcasting system in a specific geographic region of the data broadcasting system;

determine changes in profile information of a predetermined number of the plurality of subscriber units; and adjust a rate of recurrence of broadcast information at the server in the specific region of the data broadcasting system as a function of profile information associated with the at least one subscriber unit and by comparing the plurality of subscriber units that include a particular document its corresponding profile information at a current point in time with a corresponding number of plurality of subscriber units at a previous point in time.

13. The computer program product of claim 12, further comprising logic instructions embodied on a computer-readable storage medium which, when executed, configure the processor to obtain profile information associated with the at least one subscriber unit.

14. The computer program product of claim 12, further comprising logic instructions embodied on a computer-readable storage medium which, when executed, configure the processor to retrieve profile information from a data store.

15. The computer program product of claim 12, further comprising logic instructions embodied on a computer-readable storage medium which, when executed, configure the processor to increase the rate of recurrence of broadcast information specified in the profile information associated with the at least one subscriber unit in response to an increase in demand for the broadcast information.

16. A computer program product comprising logic instructions embodied on a computer-readable storage media which, when executed by a processor, configure the processor to:

establish an initial broadcast recurrence rate for one or more documents in a data broadcast region;

determine a plurality of subscriber units which are in the data broadcast region;

monitor profile information and monitor changes in profile information for the plurality of subscriber units in the data broadcast region; and adjust the broadcast recurrence rate at a broadcast server for one or more documents in the data broadcast region as a function of profile information associated with the plurality of subscriber units and by comparing the plurality of subscriber units that include a particular document its corresponding profile information at a current point in time with a corresponding number of plurality of subscriber units at a previous point in time.

17. The computer program product of claim 16, further comprising logic instructions embodied on a computer-readable storage media which, when executed by a processor, configure the processor to compare location signal information from a subscriber unit received at a first data broadcast region with location signal information from the subscriber unit received at a second data broadcast unit.

18. The computer program product of claim 16, further comprising logic instructions embodied on a computer-readable storage media which, when executed by a processor, configure the processor to monitor changes to profile information associated with the plurality of subscriber units.

19. The computer program product embodied on a computer-readable storage media of claim 16, wherein the determining a plurality of subscriber units which are in the data broadcast region further comprises establishing a communication uplink to obtain location information from the plurality of subscriber units.

* * * * *